F. P. WADDELL.
FIVE HORSE EVENER.
APPLICATION FILED SEPT. 23, 1916.
1,214,728.
Patented Feb. 6, 1917.
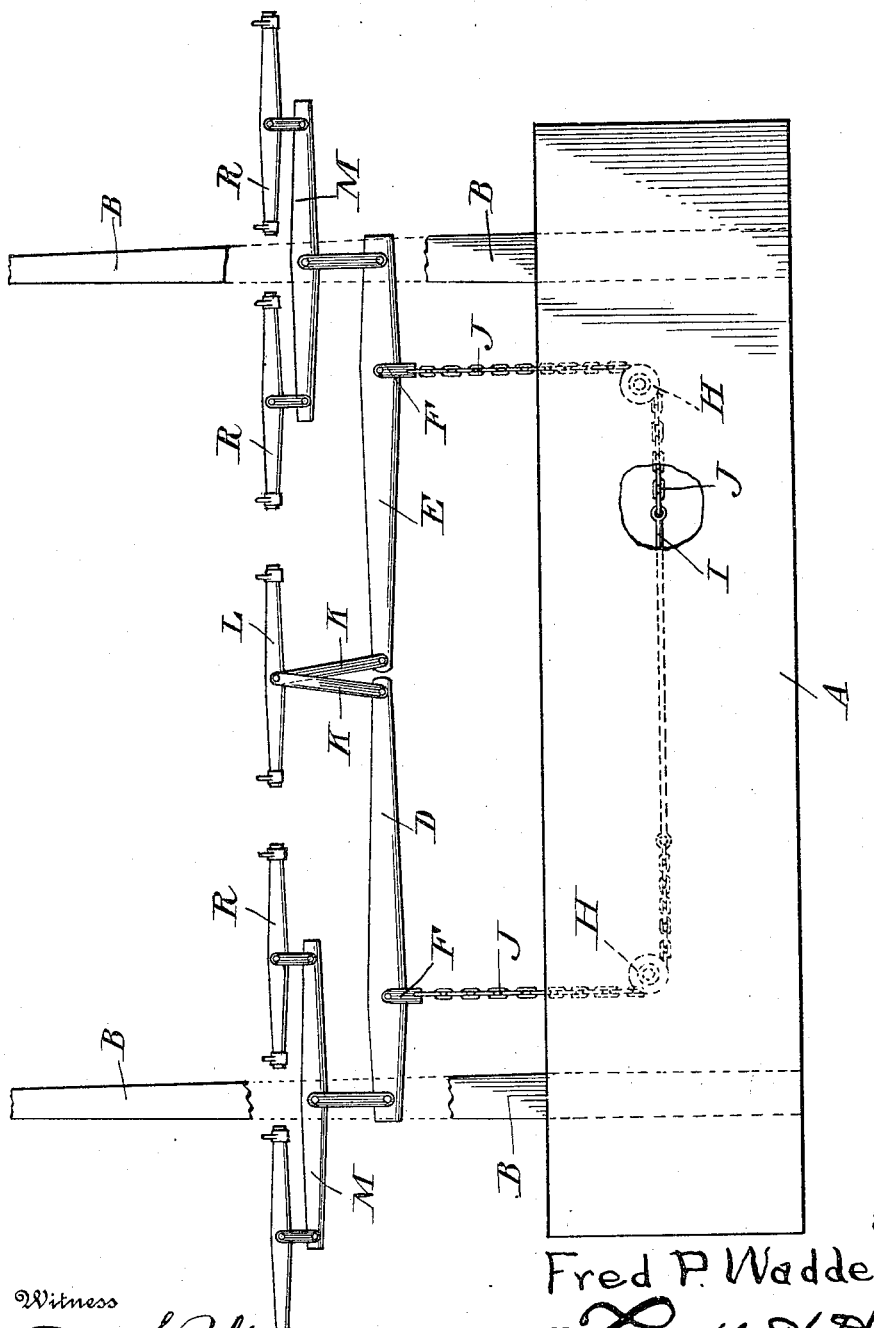
Witness
Fenton W Belt
A. L. Hough
Inventor
Fred P. Waddell.
By Franklin N. Hough
Attorney

UNITED STATES PATENT OFFICE.

FRED P. WADDELL, OF MADDOCK, NORTH DAKOTA.

FIVE-HORSE EVENER.

1,214,728.    Specification of Letters Patent.    Patented Feb. 6, 1917.

Application filed September 23, 1916. Serial No. 121,814.

*To all whom it may concern:*

Be it known that I, FRED P. WADDELL, a citizen of the United States, residing at Maddock, in the county of Benson and State of North Dakota, have invented certain new and useful Improvements in Five-Horse Eveners; and I do hereby declare the following to be a full, clear, and exact description of the invention, such as will enable others skilled in the art to which it appertains to make and use the same, reference being had to the accompanying drawings, and to the letters and figures of reference marked thereon, which forms a part of this specification.

This invention relates to new and useful improvements in five horse eveners, especially designed for use upon grain drills, and consists of a simple and efficient device of this nature having various details of construction, combinations and arrangements of parts which will be hereinafter fully described, shown in the accompanying drawings and then specifically defined in the appended claim.

I illustrate my invention in the accompanying drawing, in which I have shown a top plan view illustrating the invention as applied to the drill frame.

Reference now being had to the details of the drawings by letter, A designates the frame of a drill and B poles secured thereto.

The eveners are designated respectively by letters D and E and are of similar construction and have their inner ends convexed and have clevises F secured thereto.

Pulleys H are mounted upon the drill frame and chains J are fastened at their inner ends to a rod I and each chain passes about a pulley H and is fastened to a clevis F, as shown. Said chain and rod form the connection between the evener apparatus and the drill frame, as shown clearly in the drawings.

The inner ends of the eveners D and E have rods K fastened thereto, holding the adjacent ends of the eveners in contact with or adjacent to each other, and two rods K at their forward ends are connected to the central portion of the whiffle tree L.

Double whiffle trees, designated by letter M, are pivotally connected to the links O with the ends of the eveners E and D and have connected to each of their ends a swingle tree R.

By the provision of a five horse evener made in accordance with my invention and which is especially designed for use in connection with grain drills, it will be noted that the draft of the various horses attached to the swingle trees will be equalized by the connections of the two eveners D and E at the locations shown intermediate the sides thereof and their outer ends, thus equalizing the pull upon the five different swingle trees.

What I claim to be new is:—

A five-horse evener comprising, in combination with a drill frame having forwardly extending shafts, pulleys journaled upon said frame, eveners having their outer ends flush with the outer edges of said shafts, eccentrically mounted clevises pivotally connected to said eveners, chains passing about said pulleys and connected one to each of said clevises, a whiffletree, links pivotally connected to the center thereof and one connected to the inner end of each of said eveners, doubletrees with link connections intermediate the same and the outer ends of said eveners and above said shafts, and swingle trees pivotally connected to the doubletrees.

In testimony whereof I hereunto affix my signature in presence of two witnesses.

FRED P. WADDELL.

Witnesses:
 J. I. HEGGE,
 J. BISEK.

Copies of this patent may be obtained for five cents each, by addressing the "Commissioner of Patents, Washington, D. C."